United States Patent [19]

Kuckes

[11] Patent Number: 5,258,755
[45] Date of Patent: Nov. 2, 1993

[54] TWO-SOURCE MAGNETIC FIELD GUIDANCE SYSTEM

[75] Inventor: Arthur F. Kuckes, Ithaca, N.Y.

[73] Assignee: Vector Magnetics, Inc., Ithaca, N.Y.

[21] Appl. No.: 873,767

[22] Filed: Apr. 27, 1992

[51] Int. Cl.⁵ .............................................. G01V 1/00
[52] U.S. Cl. ........................... 340/853.5; 340/853.8;
    175/45; 324/207.11; 324/220; 324/244; 33/304;
    33/310; 33/355 R
[58] Field of Search ...................... 340/853.5, 853.8;
    324/207.11, 220, 221, 235, 236, 244, 246, 260,
    261, 345, 346, 247; 33/302, 304, 310, 355 R,
    356; 175/45

[56] References Cited

U.S. PATENT DOCUMENTS

| | | | |
|---|---|---|---|
| 3,285,350 | 11/1966 | Henderson | 340/853.5 |
| 3,406,766 | 10/1968 | Henderson | 175/61 |
| 3,529,682 | 9/1970 | Coyne et al. | 175/45 |
| 3,589,454 | 6/1971 | Coyne | 175/45 |
| 3,731,752 | 5/1973 | Schad | 175/45 |
| 4,447,779 | 5/1984 | Gelinas | 324/244 |
| 4,560,930 | 12/1985 | Kouno | 324/247 |
| 4,600,883 | 7/1986 | Egli et al. | 324/246 |
| 4,637,480 | 1/1987 | Obrecht et al. | 175/453 |
| 4,646,277 | 2/1987 | Bridges et al. | 367/191 |
| 4,649,349 | 3/1987 | Chiron et al. | 324/346 |
| 4,812,812 | 3/1989 | Flowerdew et al. | 324/346 |
| 4,875,014 | 10/1989 | Roberts et al. | 324/326 |
| 4,933,640 | 6/1990 | Kuckes | 175/45 |
| 5,103,920 | 4/1992 | Patton | 175/45 |
| 5,107,938 | 4/1992 | Okamoto et al. | 175/45 |

*Primary Examiner*—J. Woodrow Eldred
*Attorney, Agent, or Firm*—Jones, Tullar & Cooper

[57] ABSTRACT

A magnetic field guidance system for guiding a movable carrier such as a drill assembly with respect to a fixed target includes a pair of magnetic field sources at one location, such as the carrier, and a highly sensitive magnetic field detector at the other location, or target. The first field source is driven by an alternating current to produce a low frequency alternating axial field, while the second source is a magnet which produces a field perpendicular to the axis of the first field. Where the magnetic field sources are mounted on a rotatable drill assembly, the second source may be a permanent magnet which rotates with the drill assembly. The detector may be a fluxgate magnetometer which senses the direction of the target location with respect to the direction of the axial field by determining the deviation from perpendicular of the two magnetic fields at the target location.

18 Claims, 4 Drawing Sheets

FIG. 5
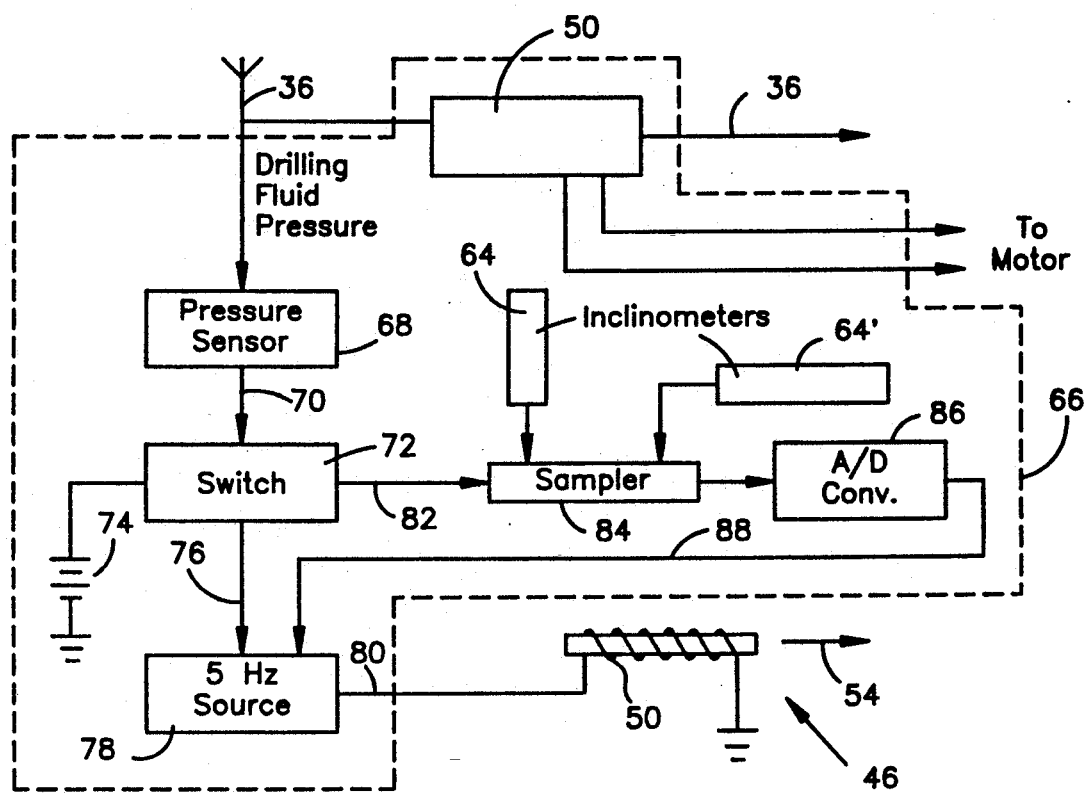
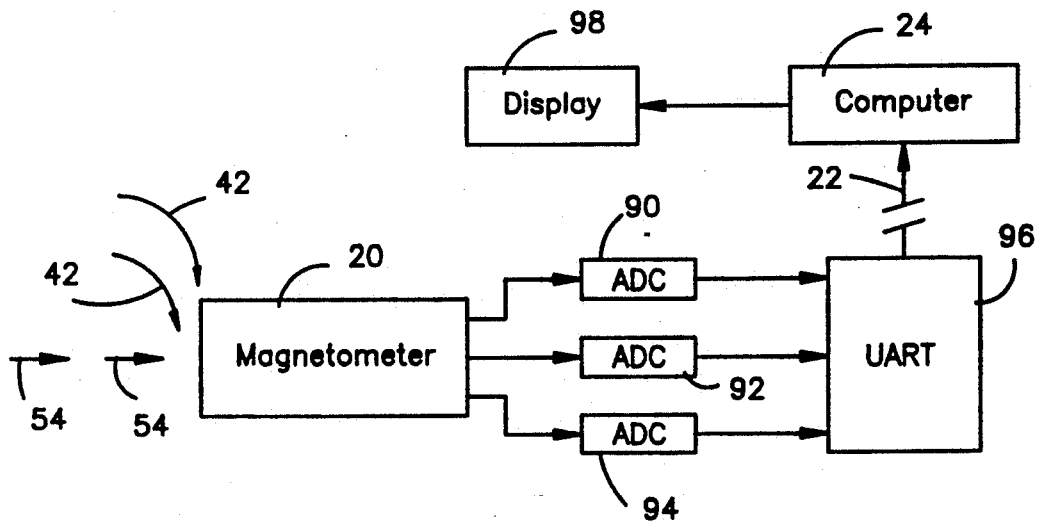
FIG. 6

TWO-SOURCE MAGNETIC FIELD GUIDANCE SYSTEM

BACKGROUND OF THE INVENTION

The present invention relates, in general, to a magnetic field guidance system and, more particularly, to a guidance system utilizing magnetic field sources for use in guiding a movable carrier, such as a continuously steerable borehole drilling system, with respect to a target magnetic field sensor.

Guidance systems utilizing varying magnetic fields superimposed on the earth's magnetic field have long been known and have been used for a wide variety of purposes. A principle use of such systems has been found in the guidance of steerable drills for the drilling of horizontal boreholes, for example, in the manner illustrated and described in U.S. Pat. Nos. 3,731,752 issued to Charles A. Schad, 3,406,766 to John K. Henderson, and 4,646,277 to Jack E. Bridges et al, but such systems are also useful in other arenas as diverse as, for example, well logging, instrument landing systems for aircraft, navigation systems for ships, and the like.

Patents such as those of Schad, Henderson and Bridges operate by producing a magnetic field at one location, sensing that field at a second location, and controlling a movable carrier such as a drill in accordance with the sensed field. In general, systems of the type represented by the Schad, Henderson and Bridges work well to direct a drill toward a target location, but have the disadvantage of not providing information about the relative distance or the direction of the target. Furthermore, some of these systems may cause the drill to follow magnetic field lines, rather than traveling toward the target.

Other patents, such as that shown in U.S. Pat. No. 4,812,812 to Flowerdew attempt to overcome these problems, for example, by providing accelerometers to locate the vertical and to provide a reference for a rotating magnetic field. However, such systems require the use of additional instrumentation, and may also be prone to error if the measuring instrument is either moving or vibrating.

Still other systems for guiding horizontal drilling, such as that disclosed in U.S. Pat. Nos. 3,529,682 and 3,589,454 to James C. Coyne, have relied upon surface wires to provide magnetic fields which will guide underground drills. However, the use of such surface wires is often inconvenient, and may not be possible where there are intervening property owners or intervening surface obstacles, or where the drilling to be guided is at a great depth.

SUMMARY OF THE INVENTION

The present invention is directed to a guidance system useful in directing movable carriers in their motion with respect to a fixed target location. More particularly, the invention is directed to the guidance of a horizontal borehole being drilled with respect to a target underground location. In accordance with a preferred form of the invention, the target is a highly sensitive orthogonal magnetic field detector which includes a carrier or support on which is mounted a three-component fluxgate magnetometer. The target may be located, for example, in a target borehole spaced at a distance from a borehole which is being drilled in a direction having a horizontal component. A continuously steerable drilling system such as that used by, or available from, a number of drilling companies such as Eastern Christensen, Inc. or Sperry Sun, Inc. may be used. Typically, such drill systems include a drill stem which carries, at its lowermost end, a drill collar which supports a fluid-powered steerable downhole drilling motor. A rotary drill bit is connected to the motor and is driven in response to the motion of drilling fluid down the borehole. The drill collar conventionally is a bent connection between the drill motor to the drill stem to provide steerability.

A continuously steerable drilling system typically operates in two modes. In a rotary drilling mode, the drill motor drives the bit, and in addition, the entire drill stem is rotated at the surface, and drilling proceeds in a straight line along the borehole axis. In this mode, the drill bit rotation speed is the sum of the motor speed and the surface rotation speed of the drill stem. The second mode of operation is the motoring mode wherein the drill stem is held fixed at the surface and the drilling is done entirely by the fluid-powered downhole motor. In this mode, the direction of drilling changes because the connection between the motor and the drill collar directly behind it is slightly bent. The orientation of this so-called "bent connection" or "bent sub", defines the drill face; that is, the direction in which the borehole will turn, and is controlled by the rotational position of the drill stem.

In accordance with the present invention, the drill collar contains two magnetic field sources which form the two-source portion of the present guidance system. One of the sources is a solenoid axially aligned with the drill collar, while the other magnetic field source may be a permanent magnetic which is mounted so as to be perpendicular to the axis of the drill collar, and thus perpendicular to the axis of the solenoid. In addition to these two magnetic sources, the drill collar preferably includes two inclinometers whose axes of sensitivity are perpendicular to each other and perpendicular to the drill collar axis, and thus also perpendicular to the axis of the solenoid. Each of the inclinometers generates an electrical voltage proportional to the projection of the earth's gravity vector on its axis of sensitivity. When the instrument of the present invention is operated in a steering mode, the inclinometer voltages are sequentially sampled by an analog to digital converter (ADC), and the resulting ones and zeroes are transmitted through a universal, asynchronous receiver/transmitter (UART) to circuitry which sends a sequence of alternating current bursts to the axially aligned solenoid. The solenoid produces corresponding magnetic field bursts which vary in accordance with the sequence of ones and zeroes produced by the ADC (based on the outputs of the inclinometer voltages) and these signals are received by the receiving magnetometer at the target location for transmission to a computer at the earth's surface. In this way, the instantaneous orientation of the drilling tool face can be transmitted to the drill floor at the surface.

The magnetometer at the target location is a three component fluxgate magnetometer, in the preferred form of the invention, and this magnetometer is deployed to produce voltage outputs proportional to each of three orthogonal vector components of the total magnetic field present at the magnetometer location. Each such vector component has a steady part which is generated by the earth and a much smaller, time varying part which is generated by the two-source apparatus in the drill collar. The time varying part of the magnetic field is made up of two components. The first component is a varying field generated by the application of an alternating signal to the axial solenoid carried by the drill collar. This signal may be a continuous sinusoidal signal at a frequency of, for example, 5 Hz during drilling operations, or may be a series of pulses to produce a pulsed varying magnetic field when data such as information relating to the orientation of the drill face is to be detected. The second component is a lower frequency varying field which is generated by the perpendicular magnetic field source in the drill collar when the collar is rotated. This signal may, for example, have a frequency of about 0.5 Hz, corresponding to the rate of rotation of the drill stem. The three magnetometer outputs are digitally encoded by an ADC at the target location and the digital signals are supplied to a UART for transmission to a computer at the earth's surface through the use of well-known electronic and modem methods. The computer is programmed to recover the earth's field component, the 5 Hz component, and the 0.5 Hz component through the use of well known vector analysis techniques which do not form a part of the present invention.

The two-source guidance system has two modes of operation, one for each mode of drilling. During the rotary drilling mode, wherein the entire drill stem is rotated at the surface, a first varying axial source magnetic field is generated by application of an alternating current to the winding of the solenoid, and a second varying source magnetic field perpendicular to the first field is generated by rotation of the downhole permanent magnet. The detection apparatus at the target location receives the magnetic field signals generated by each of the sources, and, as described above, the resulting output signals from the detection apparatus are supplied to a computer which uses the time varying magnetic field signals to compute the angle between the direction of drilling and the direction to the target magnetometer, as well as to compute the distance between the sources and the target magnetometer. The computer may also compute the drilling direction adjustment needed to achieve the desired borehole path relative to the target. These quantities may be displayed to the directional driller to help the driller decide when and what drilling direction changes are needed to drill along the desired path.

To make a drilling direction change, the second mode of drilling, the motoring mode, is used. During this mode, also called the steering mode, the drill stem is held fixed at the earth's surface, and all drilling is done with the downhole motor. At this time, the role of the two-source system is to inform the driller of the orientation of the tool drilling face; that is, of the orientation of the bent connection between the drilling motor and the drill collar with respect to the downward direction of the earth's gravity field. This orientation is computed using the output signals from the inclinometers discussed above, the inclinometers being attached to the drill collar at the motor location. The inclinometer signal outputs are encoded by an analog-to-digital converter at the drill collar to produce ones and zeroes which drive the solenoid to produce corresponding bursts in the axial magnetic field. These field bursts are received by the magnetometer at the target location, as described above, and the resulting output signals from the magnetometer are sent to the surface computer. The computer receives these signals and computes the drilling tool face orientation, displaying it to the directional driller who can then change the direction of drilling in a controlled way.

The downhole two-source guidance apparatus is switched between the rotary drilling mode and the motoring mode from the surface by any suitable switching mechanism. In one form of the invention, battery powered downhole electronic circuitry is provided which responds to predetermined sequences of drilling fluid pressure pulses generated by suitable valving on the drilling fluid flowing into the drill stem.

BRIEF DESCRIPTION OF THE DRAWINGS

The foregoing and additional objects, features and advantages of the present invention will become apparent to those of skill in the art from a consideration of the following detailed description of the preferred form of the invention, taken in conjunction with the accompanying drawings, in which:

FIG. 5 is a block diagram of the control circuitry for the two magnetic field sources in the drill stem assembly; and FIG. 6 is a block diagram of the electrical circuitry for the target location.

DESCRIPTION OF PREFERRED EMBODIMENT

Figure 1:
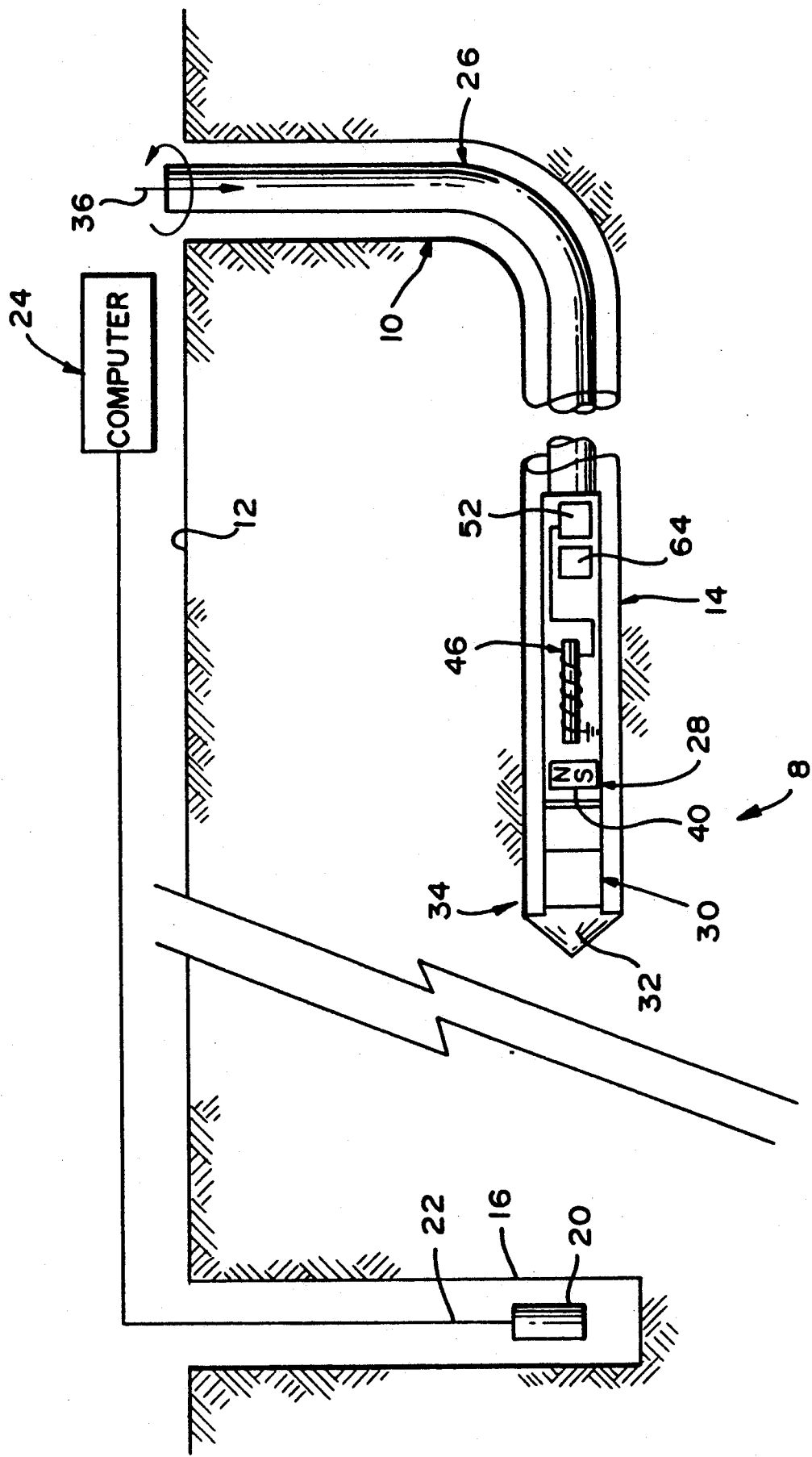
FIG. 1 is a diagrammatic view of the two-source magnetic field guidance system of the present invention, illustrating a magnetic field sensor in a target location and a drill collar carrying two magnetic field sources in a borehole being drilled.

Turning now to a more detailed consideration of the present invention, FIG. 1 illustrates a two-source guidance system 8 wherein two varying magnetic fields produced by perpendicular sources at a first location are detected at a second location and wherein measurements are made of the two fields to determine the relative motion of the source of the two magnetic fields and the target. This measurement may then be used to correct the direction of motion of the target and or the source of the two perpendicular magnetic fields. The system is illustrated in use with a borehole drilling system, wherein a drill moves with respect to a fixed target, but it will be apparent from what follows that the measurement system described hereinbelow may be used for other guidance purposes than for the disclosed application.

Figure 2:
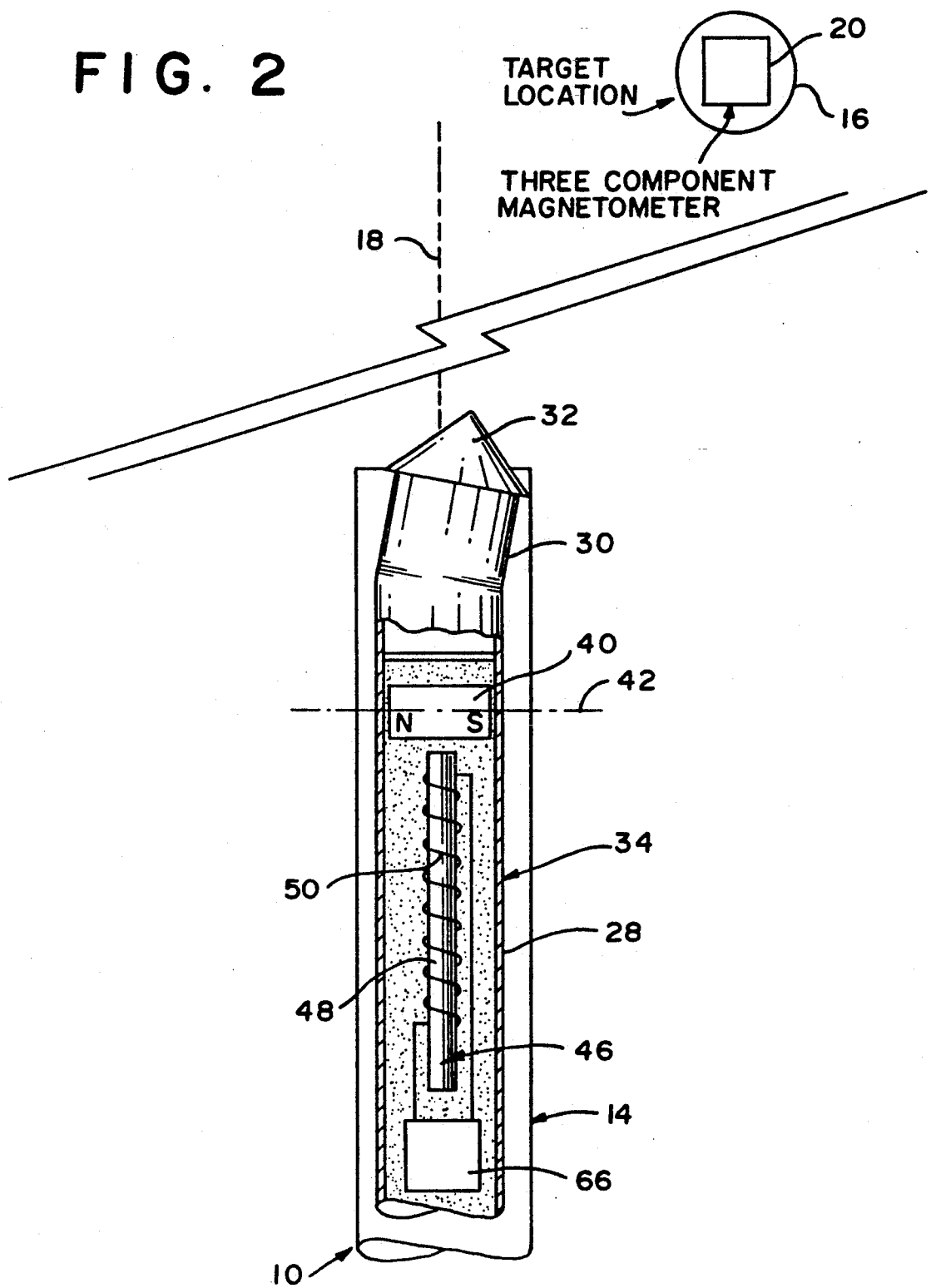
FIG. 2 is a plan view of the borehole and target of FIG. 1.

The guidance system 8 of FIG. 1 is illustrated as being located in a borehole 10 being drilled from the surface 12 of the earth. The borehole is illustrated as being generally vertical at the surface and generally horizontal at its terminal end portion 14. As indicated in FIG. 1 and in the top plan view of FIG. 2, the end portion 14 of the borehole is being drilled in a direction generally toward a target 16 which, for purposes of illustration, may be a vertical borehole spaced from the borehole 10. The borehole 10 being drilled may be intended either to intersect with the target location or to bypass it by a predetermined amount, as desired, but in either case, accurate and reliable directional information is required. The illustration in FIG. 2 shows the borehole 14 having its axis in a direction indicated by the dotted line 18 which, when extended, bypasses the target location 16. A three component fluxgate magnetometer 20 is supported at the target location, as by a cable 22 through which the magnetometer is electrically connected to a surface computer 24 which receives the signals generated by the magnetometer. The magnetometer is conventional, with a suitable instrument being of the type described and illustrated in U.S. Pat. No. 3,731,752, for example.

Located in the borehole 10 is a drill stem 26 which extends from the surface downwardly into the horizontal portion 14 of the borehole being drilled. At the distal end of the drill stem is a conventional drill collar 28 to which is connected a drilling mechanism such as motor 30 which, in turn, is connected to and drives a coaxial drill bit 32. In a preferred form of the invention, the connection between the drill collar and the drilling motor is in the form of a so-called "bent connection" which angles the axis of the drill bit and thus the axis of motor 30 slightly with respect to the axis of the drill collar 28 to permit the drill bit to change the direction of the borehole, as required. This is accomplished by rotating the drill stem as required, so that the bent connection provides a continuously steerable drilling system which is capable of operating in two modes.

The first mode of operation of the drilling system is a rotary drilling mode in which the entire drill stem 26 is continuously rotated at the surface, thereby causing the entire drill assembly 34, which includes the drill bit 32 and drill motor 30, as well as the bent connection and the collar 28, to be rotated about the axis of the drill stem as drilling progresses. This allows the drilling to proceed in a straight line along the axis 18 of the borehole with the borehole and the drill stem being substantially coaxial. In this mode, the speed of rotation of drill bit 32 is the sum of the drill motor speed and the surface rotation speed of the drill stem.

The second mode of operation of the drilling system may be referred to as the motoring mode, or the steering mode, wherein the drill stem 26 is held fixed at the surface so that it doesn't rotate, and the drilling is done entirely by the fluid-powered downhole motor 30 driving drill bit 32. In this mode, the direction of drilling changes because the connection between the motor 30 and drill collar 28 is slightly bent, causing the drill to deviate from the axial path 18. The orientation of the bent connection defines the angle of the drill face with respect to the axis of the borehole, and thus determines the direction in which the borehole will turn.

In a conventional manner, the drill motor 30 preferably is driven by the drilling fluid which enters the drill stem at the surface, as indicated by arrow 36. The fluid flows downwardly through the drill stem and through the drill motor, to produce rotation thereof, and then returns to the surface around the exterior of the drill stem.

Mounted within collar 28 (FIG. 2) are the two magnetic field sources which are used in the guidance system of the present invention. The first source is a perpendicular field source 40 which, in a preferred form of the invention, is a strong, rare earth permanent magnet having a magnetic moment of about 500 amp m$^2$. The magnet is mounted close to the distal end of the collar at the axis 18 and extends across the collar, with its magnetic axis 42 which extends between the north and south poles of the magnet, being perpendicular to axis 18. Upon rotation of the drill stem and its attached collar 28, the permanent magnet will rotate about axis 18 to generate in the earth surrounding the borehole 1? an alternating magnetic field having a frequency which is dependent upon the rate of rotation of the drill stem 26. Preferably, the rotation of the stem will cause the permanent magnet to generate a magnetic field having a frequency of about 0.5 Hz. The magnet 40 is referred to as a perpendicular field source since the axis 42 of the permanent magnet is perpendicular to the longitudinal axis 18 of the borehole being drilled and is also perpendicular to the axis of the collar 28. The magnetic field produced by the permanent magnet 40 is illustrated in plan view in FIG. 3 by the field lines 44, these field lines lying in the plane of the permanent magnet 40. Although the permanent magnet 40 preferably is mounted in the collar 28, under some conditions it is convenient to mount the magnet directly behind the drill bit 32, in which case it would rotate with the drill motor 30.

The second magnetic field source is the axial field source 46 illustrated in FIGS. 1 and 2. Source 46 is a solenoid which preferably has a silicon iron core 48 with a cross section of about 1 square inch and preferably being about 60 inches long. The solenoid carries, for example, 500 turns of wire 50 wound around the core in conventional manner. The solenoid is mounted in collar s along the axis 18 thereof, and is electrically powered by alternating current produced, for example, by a downhole alternator 52 (FIG. 1) which may be driven by the drilling fluid 36 to produce an output current sufficient to produce a magnetic moment of about 500 amp m$^2$, at a frequency of about 5 Hz. The magnetic field produced by the solenoid 46 in the plane of the permanent magnet 40 is illustrated in plan view in FIG. 3 by the field lines generally indicated at 54.

Figure 3:
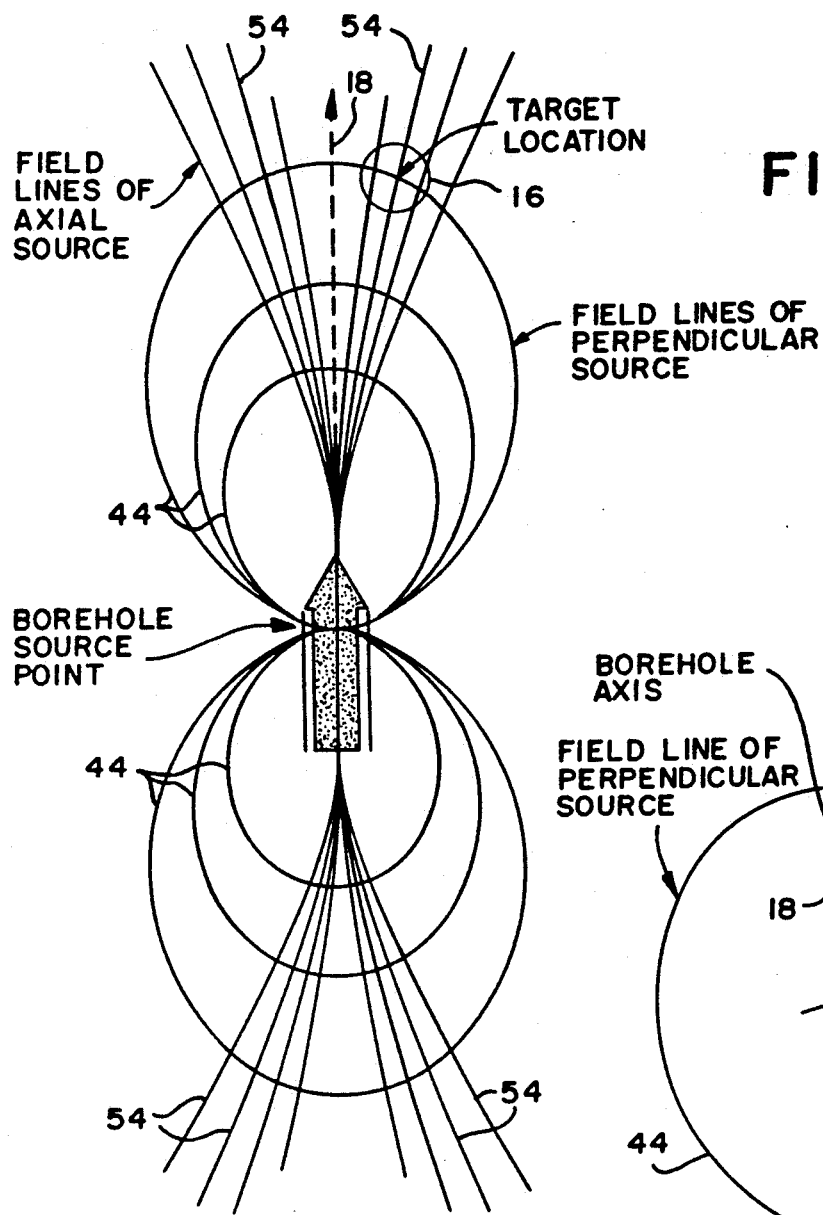
FIG. 3 is a plan view of the borehole and target of FIG. 1, illustrating magnetic field lines produced by the two magnetic field sources in the borehole.

The illustration in FIG. 3 diagrammatically shows the relationship between the field lines produced by the axial source 46 and the perpendicular source 40 in a horizontal plane passing through both sources and lying in the plane of the permanent magnet axis 41. The target magnetometer 20, for purposes of the present discussion, will be assumed also to lie in the same horizontal plane in order to simplify the relationships between the magnetic fields; however, it should be understood that it can lie either above or below that plane. The magnetometer is illustrated in FIG. 3 as being located in a target borehole 16 which is to one side of the axis 18 of the borehole being drilled. As illustrated in FIG. 3, the angle between the magnetic fields 44 and 54 will depend upon the target location with respect to the axial direction of the drill assembly 34. When the drill assembly is headed directly toward the target location so that the axis 18 of the borehole being drilled passes through the magnetometer, the magnetic fields 44 and 54 will be perpendicular to each other at the magnetometer. If the drill axis is to one side or the other of the target location, as illustrated in FIG. 3, the angle between the fields 44 and 54 will be either greater or less than 90° in the horizontal plane, depending on whether the magnetometer is on the clockwise (greater) or counterclockwise (lesser) side of the axis 18 the magnetometer lies. A similar relationship between the fields 42 and 52 exists in the vertical plane passing through the axis 18, with the fields being perpendicular to each other when the magnetometer lies on the axis 18 and with the angle between the fields being either greater than or less than 90° in the vertical plane if the axis 18 is directed above or below the location of the magnetometer.

Figure 4:
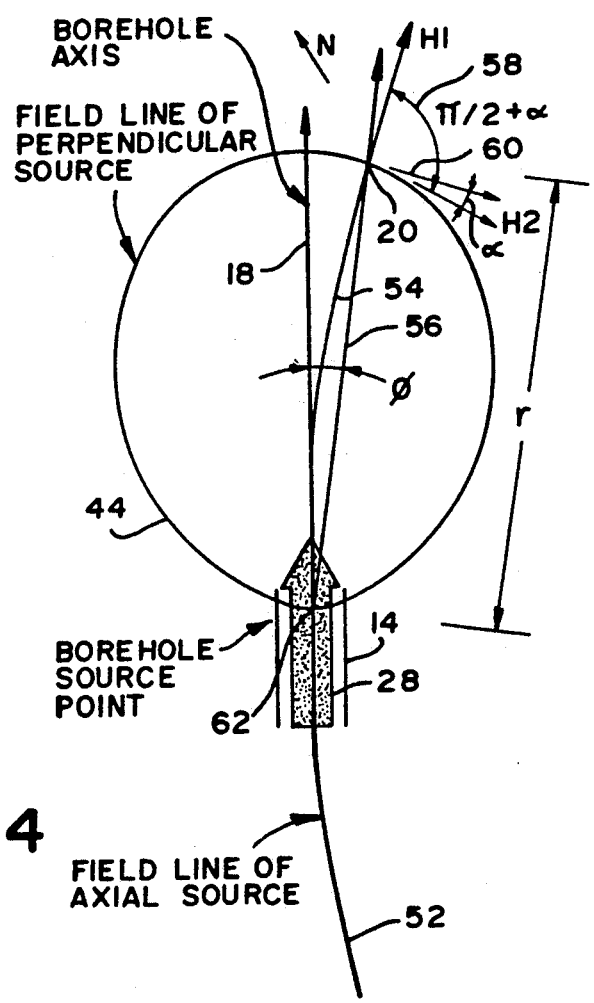
FIG. 4 is a plan view of the borehole and target of FIG. 1, illustrating field vectors and symbol definitions.

FIG. 4 is a simplified illustration of the field relationships of FIG. 3, showing a single field line 44 from the perpendicular source 40 and a single field line 54 from the axial source 46. As clearly illustrated, the nonperpendicularity of the field lines 44 and 54 at the target location 20 is a direct measure of the angle $\phi$ between the borehole axis 18 and the target intersecting line 54. Field line 54 approximates, and thus represents the distance r between the two magnetic field sources in the borehole and the target location, which distance is illustrated by radial line 56. If the axial line 18 must be rotated clockwise, as viewed in FIG. 2, to make the fields 54 and 56 perpendicular at the target location, then the target is on the "clockwise side" of the direction of drilling. Similarly, if the axis 18 must be rotated in the counterclockwise direction to produce perpendicular fields at the target, then the target is on the counterclockwise side of the direction of drilling.

When the horizontal portion 14 of the borehole 10 is headed approximately toward the target, the angle $\phi$ between the borehole axis 18 and the actual direction to the target represented by line 56 is two-thirds of the angle $\alpha$ by which the two field lines deviate from being perpendicular at the target. Up and down corrections to the drilling direction can be made using the same principle; that is, the illustration of FIG. 4 can be rotated by 90° around the axis of drilling and the same relationships exist. In addition, the same relationships exist at all the angles between the horizontal and vertical, although the vector relationships are complex.

It is noted that it is not necessary to know the orientation of the magnetometer 20 in the target borehole 16, nor is it necessary to know the relative time phase between the magnetic field sources and the fields observed at the target. Thus, no additional communication between the drilling assembly in the borehole 14 and the magnetic sensor 20 other than that provided by the magnetic fields observed at the target location is needed. The distance between the magnetic field sources and the target is found by noting the strength of the fields being measured. Once the direction of the target relative to the direction of drilling is known, the distance is readily computed either by knowing the source strength or the intensity variation in the fields observed as the sources are moved along the borehole being drilled.

The relationship illustrated in FIG. 4 may be expressed mathematically. The magnetic field vectors H1 and H2 representing the magnetic fields 54 and 44, respectively, at the location of the magnetometer 20 are separated by angle 58. Also passing through the target location 20 are the unit vector r (line 56) and the unit vector 60 perpendicular to field line 54, the vectors 56 and 60 defining which define the radial and azimuthal directions at the target location for the two field sources which, for purposes of this consideration, are assumed to be located at a source point 62 at the drill collar 28. The angle 58, expressed in radians, between the field vectors H1 and H2 is ($\pi/2+\alpha$), as illustrated in FIG. 4, and the radial distance between the source point 62 and the target location is r. In MKS units, the field vector H1 produced by the axial source 46 having strength m1, and the field vector H2 of the perpendicular source 40 having source strength m2 can be written:

$$H1 = \frac{m1}{4\pi r^3} (r\,2\cos\phi + \phi \sin\phi) \quad \text{Eq. 1}$$

$$H1 = \frac{m2}{4\pi r^3} (-r\,2\sin\phi + \phi \cos\phi) \quad \text{Eq. 2}$$

The angle 58 between the field lines H1 and H2 can be obtained from the scalar product of the two field vectors H1 and H2; that is:

$$\sin \alpha = \frac{3 \sin\phi \cos\phi}{\sqrt{(3\sin^2\phi + 1)(3\cos^2\phi + 1)}} \quad \text{Eq. 3}$$

The foregoing is the functional relationship between the azimuthal angle $\phi$ between the direction of drilling (18) and the direction of the target (54) and the deviation from perpendicularity $\alpha$ in the field lines at the target location.

The magnetometer 20 measures the relative direction of the magnetic field H1 from some reference direction such as magnetic north, and also measures the relative direction of H2 from the same reference direction. In this way, the angle 58 between H1 and H2 can be determined and the amount by which this difference varies from the perpendicular is a measure of $\alpha$. From equation (3) the angle $\phi$ between the borehole axis 18 and the radial line 56 can they be determined. With this angle being known, and with the strength of the signal from the solenoid 44 being known from the electrical characteristics of the source and the current exciting it, the distance and direction from the drill assembly 34 to the target location 20 can be readily calculated. This determination of the direction of the target with respect to the drill assembly is done without an independent evaluation of the instantaneous phase of either the solenoid source or the perpendicular source, but the calculation does assume that the angle $\phi$ between the borehole axis and the target location is less than plus or minus 45°.

The analysis for the relative distance and direction between the borehole and the drill in the vertical plane is carried out in the same manner.

It is noted that the measurements of H1 and H2 are made with respect to magnetic north while drilling of the borehole 10 is proceeding. This measurement while drilling permits continuous monitoring of the distance and direction of the drill bit from the target location and permits continual adjustment of the drilling direction without withdrawal of the drilling assembly from the borehole. In order to make corrections of drilling direction, it is only necessary to shift from the drilling mode to the steering mode, and to set the drilling face of the drill bit 32 for drilling in the desired direction.

As previously indicated, in the rotary drilling mode of operation, both the drill stem and the drill motor are rotated to drive the drill bit and to advance the drill assembly along axis 18. However, in order to change the direction of the drilling, only the motoring, or steering mode of the assembly is used, and during this mode the two-source guidance system is used to determine the orientation of the bent connection between the drill stem and the drilling motor. As indicated above, the orientation of the bent connection within the borehole portion 14 determines the direction in which the drill bit will move upon rotation of only the drill bit. However, since the drill stem 26 normally is twisted by an unknown amount, the rotational position of the drill stem at the surface is not a reliable indication of the orientation of the bent connection. In order to determine accurately the instantaneous angular position of the bent connection, and thus of the face of the drill bit 32, a pair of inclinometers 64 and 64' are provided in the collar 28, as is generally indicated in FIG. 1 and in more detail in FIG. 5. The inclinometers preferably are mounted at right angles to each other, as illustrated diagrammatically, to provide information concerning orientation of the drill collar with respect to the vertical. Since the bent connection is fixed to the drill collar, this provides a measure of the orientation of the bent connection and thus of the direction of the drill bit face with respect to the axis of the borehole.

The inclinometers 64 and 64' and the fluid driven alternator 52 are included in a power source and electronics package generally indicated at 66 in FIGS. 2 and 5. The two-source guidance apparatus 34 is switched into and out of the rotary drilling mode from the surface, preferably by battery powered downhole electronic circuitry in the package 66. This circuitry includes a pressure sensor 68 which responds to a predetermined sequence of drilling fluid pressure pulses supplied to the drilling fluid 36. These pressure pulses are generated, for example, by valving on and off the drilling fluid 36 flowing into the drill stem at the surface. These pressure variations are detected by the sensor 68 and when a predetermined sequence is received, an output signal is provided on line 70 which activates a switch 72 to shift the drilling assembly between its modes of operation. When the assembly is in the rotary mode, the switch 72 provides battery power from a battery 74 to line 76 to activate a 5 Hz source of alternating current 78, the output of which is supplied by way of line 80 to the winding 50 on solenoid 46 to produce the magnetic field lines 54, discussed above.

When the drilling apparatus is to be in the steering mode, the pressure sensor 68 is used to shift switch 72 to supply battery power to line 82 instead of line 76 to thereby activate a sampler circuit 84. This sampler supplies the output signals from inclinometers 64 and 64' to an analog to digital converter (ADC) 86 for conversion to corresponding digital pulses which represent the orientation of the bent connection with respect to the vertical, as determined by the inclinometers. These digital pulses are supplied by way of line 88 to the AC source 78 to modulate its output, so that the current supplied to winding 50 of solenoid 46 produces a varying magnetic field 54. This varying field may be pulse modulated to produce a series of bursts, or pulses, of variable length produced by the axial source 46 to represent the ones and zeroes produced by the ADC 86 and representing the orientation of the bent connection. Alternatively, the AC source 78 may be frequency modulated to produce an alternating magnetic field having a variable frequency. The varying magnetic field is received by the magnetometer 20, as indicated in FIG. 6, and the outputs from the three magnetometer components are encoded by suitable analog to digital converters 90, 92 and 94 and supplied by way of UART 96 through cable 22 to the surface computer 24.

The orientation of the bent connection is computed in well known manner at computer 24, using the encoded outputs of the two inclinometers, and the result is displayed on a suitable display 98 for use by the drillers in controlling the orientation of the bent connection and thus controlling the direction of drilling of the motor during the steering mode. Directional control may be accomplished by rotating the drill stem 26 until the face of the drill bit 32 is oriented for drilling in the desired direction with respect to a vertical reference, continuing the drilling in only the motoring mode until the axis 18 has moved in the desired direction, and then proceeding with normal drilling in the drilling mode. While in the latter mode, continuous measurements can be made of the direction of drilling with respect to the target location, and further corrections can then made as required to cause the borehole to move in the desired direction with respect to the target location.

The relationship between the borehole axis and the target location has been illustrated in FIG. 4 as requiring a clockwise correction of the borehole axis 18 to bring that axis into alignment with the target location, and the description has been directed to that configuration. However, it will be understood that similar considerations are involved where the target location is to the left of the borehole axis 18, as viewed in FIG. 4, with only the polarity of the angles different. The same is the case for up and down corrections in the vertical plane, and for corrections in planes between the horizontal and the vertical. Furthermore, it will be apparent that corrections may be made without bringing the borehole axis 18 into alignment with the target location; instead, the borehole axis 18 may be directed to a specified location spaced to one side or the other of the target location. It is also noted that in some cases it may be desirable to determine the orientation of the target fluxgate magnetometer, and this may be done by measurements of the earth's magnetic or gravitational field at the target location. Although the herein-disclosed technique is described in terms of drilling a borehole horizontally to intercept a target it should be understood that the invention is not so limited. For example, the technique can be used to drill a borehole vertically to a target located below the drill, and thus can be used to direct drilling in any desired direction with respect to a target.

It will also be understood that although the present invention is illustrated in use with a drilling assembly which utilizes a drill bit activated by a drilling motor and by rotation of the drill stem, the invention may be adapted for use with other drilling techniques. For example, the drilling assembly may consist of a hydraulic drill, wherein drilling is accomplished by high pressure hydraulic jets which are movable to control the direction of drilling without the need to rotate the drill stem. In such a case, the permanent magnet which produces the perpendicular field would not be rotated by the drill stem, but would be separately rotated, as by a small electric motor or a motor driven by the drilling fluid. Alternatively, the perpendicular field can be varied by utilizing a solenoid driven by an alternating current of a different frequency than that used for the axial field. In such a case, the perpendicular field can be modulated by the inclinometer output, if desired.

The foregoing discussion has been in terms of controlling a drilling assembly for guidance of boreholes; however, there are other applications of the method disclosed herein. For example, the method may be used for instrument landing systems for aircraft wherein, for example, the alternating magnetic source may be installed in the runway and the magnetic field receiver, or magnetometer, may be located in the aircraft. In this case the rotating permanent source may be replaced by an equivalent electrically powered alternating magnetic field source with an axis perpendicular to that of the axial solenoid. The frequency of the second source would be different than that of the first source, or alternatively, the two sources would be alternately activated. The analysis as given above would apply to such a system, although the range would be greater and the electrical frequency of operation higher. In such an application, it would be important to compensate for the secondary magnetic fields generated by eddy currents flowing in the earth, so each airport location would have to incorporate field form factors which would be taken into account in computing the information required for landing.

Although the present invention has been described in terms of preferred embodiments, numerous variations and modifications may be made, as will be recognized by those of skill in the art, without departing from the true spirit and scope of the invention as set forth in the following claims.

What is claimed is:

1. A magnetic field guidance system, comprising:
   a movable carrier;
   a fixed carrier;
   first and second magnetic field sources located at a first one of said movable and fixed carriers;
   said first magnetic field source including a solenoid having a directional axis and a source of low-frequency alternating current connected to said solenoid to produce a first, axial magnetic field surrounding said first one of said movable and fixed carriers;
   said second magnetic field source including a magnet producing a second magnetic field perpendicular to said axial magnetic field and surrounding said first one of said movable and fixed carriers;
   a highly sensitive three-axis magnetic field detector mounted at a second one of said movable and fixed carriers said magnetic field detector being responsive to vector components of said axial and perpendicular magnetic fields to produce corresponding vector output signals for determining the deviation from perpendicularity of said axial and perpendicular magnetic fields at the location of said detector, whereby the angle between said directional axis and a radial line between the locations of said first and second carriers is determined.

2. The system of claim 1, wherein said first magnetic field source includes means for modulating said source of low-frequency alternating current.

3. The system of claim 2, wherein said modulating means includes inclinometer means responsive to the orientation of said directional axis converting with respect to vertical to produce corresponding output signals, and encoding means for said output signals to corresponding encoded signals for modulating said source of low frequency alternating current.

4. The system of claim 3, wherein said detector is responsive to said axial magnetic field to produce signals at said second one of said movable and fixed carriers which correspond to said encoded signals.

5. The system of claim 4, wherein said first one of said movable and fixed carriers is a movable carrier capable of motion along said directional axis and wherein said second one of said movable and fixed carriers is a fixed carrier, said system further including steering means for directing the motion of said movable carrier with respect to said fixed carrier.

6. The system of claim 1, wherein said second magnetic field source is a permanent magnet.

7. The system of claim 1 wherein said second magnetic field source is powered by a low frequency source of alternating current.

8. The system of claim 7, wherein said second field source has a frequency different than that of said first magnetic field source.

9. The system of claim 1, wherein said movable carrier is a drilling assembly

10. The system of claim 9, wherein said fixed-carrier is a support for said magnetic field detector and is located in a target location.

11. The system of claim 10, wherein said detector is a fluxgate magnetometer.

12. The system of claim 10, wherein said drilling assembly includes a drill collar, a drilling motor connected to said drill collar through a bent connection, and a drill bit carried by said motor, said drilling assembly being substantially coaxial with said directional axis.

13. The system of claim 12, wherein said drilling assembly is connected at the distal end of a drill stem for rotation therewith, said drill bit being additionally rotated by said drill motor.

14. The system of claim 13, wherein said drill bit is driven by said drill motor for steering said drilling assembly to thereby vary the direction of said directional axis with respect to said target borehole.

15. The system of claim 14, wherein said first magnetic field source further includes switch means for disconnecting said source of alternating current from said solenoid.

16. The system of claim 14, further including a source of encoded signals representing the orientation of said directional axis, and means operable to modulate said source of low-frequency alternating current by said encoded signals to cause said solenoid to produce variable axial magnetic field corresponding to said encoded signals.

17. The system of claim 16, wherein said detector is responsive to said variable axial magnetic field to produce signals at said target borehole which correspond to said encoded signals.

18. The system of claim 17, further including selectively operable switch means for connecting said source of alternating current directly to said solenoid during a rotary drilling mode of operation of said drilling assembly, and for connecting said source of encoded signals to modulate said source of alternating current during a steering mode of operation of said drilling assembly.

* * * * *